Dec. 12, 1967 J. C. DANLY 3,357,755
BALL BEARING DIE SET
Filed Oct. 23, 1965
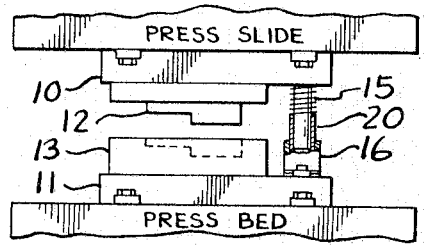
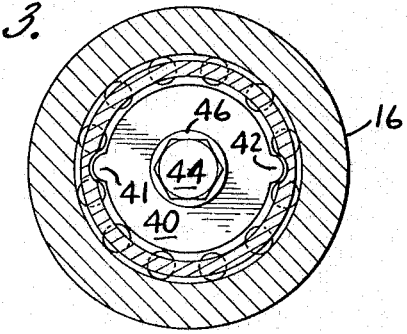
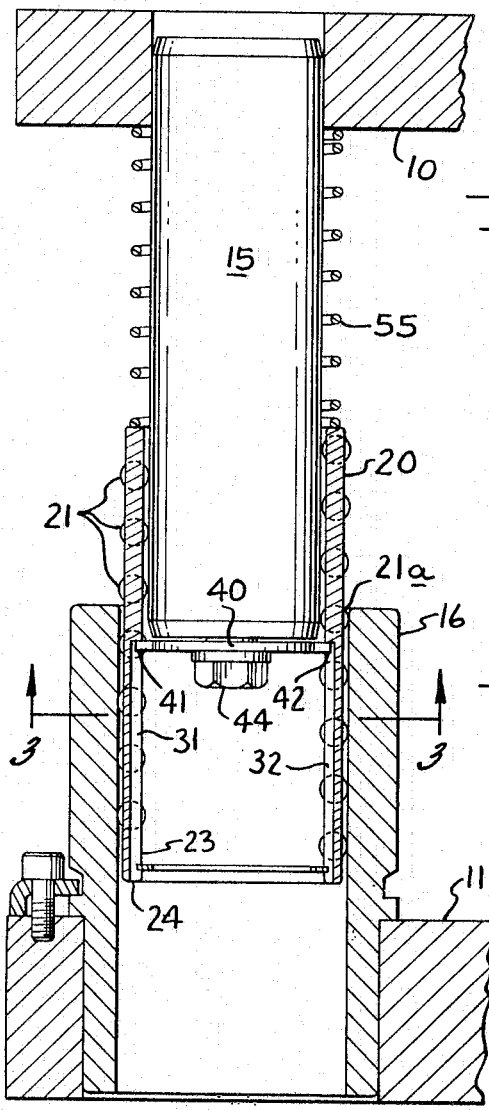
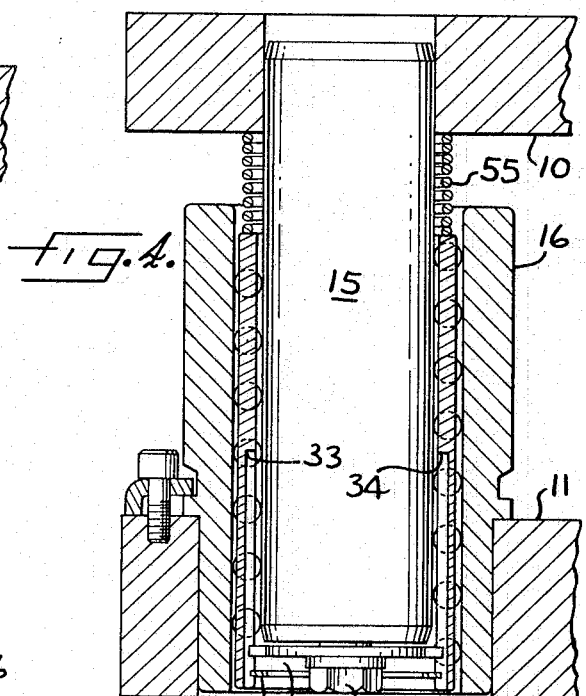
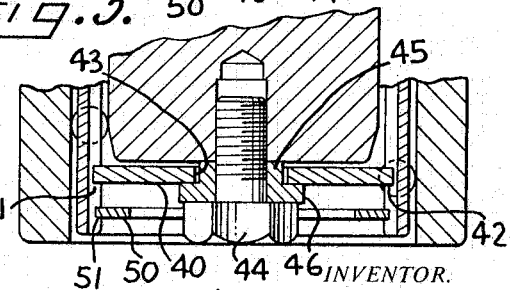
INVENTOR.
James C. Danly,
BY
Wolfe, Hubbard, Voit & O'sann
ATTORNEYS.

United States Patent Office 3,357,755
Patented Dec. 12, 1967

3,357,755
BALL BEARING DIE SET
James C. Danly, River Forest, Ill., assignor to Danly Machine Specialties, Inc., Chicago, Ill., a corporation of Illinois
Filed Oct. 23, 1965, Ser. No. 503,084
7 Claims. (Cl. 308—6)

ABSTRACT OF THE DISCLOSURE

A ball bearing die set is provided with a novel stop arrangement including a stop member secured to the end of the post in which the only grooving required is the machining of one or more grooves in the soft metal forming the inside of the ball bearing cage.

The present invention relates to die sets for use in a power press and more particularly to die sets employing ball bearings.

It has been recognized in the past, for example in Blazek Patent 2,846,278, that it is desirable to support a ball bearing die cage in a semi-extended position prior to engagement of the post and sleeve elements for equalized travel of the balls with respect to the surfaces of the post and sleeve. However, the conventional supporting and guiding arrangements have not been completely satisfactory because of the inconvenience and expense involved in modifying the post or sleeve. In general, such modification has included either the forming of a relatively deep bore in the post or the necessity for cutting into the bearing surfaces in one of the members either to form a groove therein or to provide a mount for a fixed stop. Any modification of this kind not only involves expense but tends to destroy the integrity and symmetry of the part.

Accordingly it is an object of the present invention to provide a ball bearing die set in which novel means are provided for supporting and guiding the ball bearing cage. It is more specifically an object of the invention to provide a ball bearing die set which avoids the necessity for machining or in any way tampering with the bearing surfaces of the post and sleeve and which avoids any necessity for forming a deep bore in the post. Thus it is an object to provide a ball bearing die set in which a novel stop arrangement is employed including a stop member secured to the end of the post in which the only grooving required is the machining of one or more grooves in the soft metal forming the inside wall of the bearing cage while preserving the strength of the cage. It is a related object of the invention to provide a stop and groove configuration in which the stop is relatively free floating and presents a smooth continuous surface to the groove to provide a device which is inherently long wearing. It is another object of the invention to provide a ball bearing die set having a grooved cage but which is distinguished by symmetry, with the cage being free to rotate with respect to the post and sleeve during the normal operation of the die set to distribute the wear of the balls about the bearing surfaces on both the post and sleeves. It is yet another object of the invention to provide a ball bearing die set in accordance with the foregoing which is economical to manufacture, which is capable of use with plain posts and sleeves thus reducing inventory, and which can be used either direct or inverted, i.e. with the post in either the upper or lower position, with equal advantage.

Other objects and advantages of the invention will become apparent upon reading the attached detailed description and upon reference to the drawings in which:

FIGURE 1 is a diagrammatic view showing a press slide and bed having a die set constructed in accordance with the present invention.

FIG. 2 is a vertical section taken through a post-and-sleeve combination and with the elements shown just prior to engagement.

FIG. 3 is a transverse section taken along the line 3—3 in FIG. 2.

FIG. 4 is a vertical section similar to FIG. 2 but with the post and sleeve fully engaged with one another.

FIG. 5 is a fragmentary section taken through the stop member or washer at the lower end of the post.

While the invention has been described in connection with a preferred embodiment, it will be understood that I do not intend it to be limited to the embodiment described but intend to cover the various alternative and equivalent constructions included within the spirit and scope of the appended claims.

Turning now to FIGURE 1 there is shown a typical die set installation including a punch holder 10 and a die holder 11 mounting male and female dies 12, 13 respectively. For guiding the members 10, 11 a pair of pins 15, only one of which is shown, telescope into a pair of sleeves 16 which are respectively alined therewith.

As shown in detail in the remaining figures, there is interposed, between the post and sleeve, a ball bearing cage 20 having a set of balls 21 which are captive in apertures distributed along the length of the cage and symmetrically about the cage periphery. The apertures may, for example, be bored in a suitable indexing jig, and the edges of the apertures may be upset, after the balls are inserted, to the extent necessary to hold the balls in place. Preferably the cage is made of non-ferrous material such as brass or a relatively soft bronze. The balls are of uniform size having a diameter which equals or just slightly exceeds the radial clearance between the post and the sleeve. The length of the cage preferably corresponds to the mount of engagement, or overlap, between the post and the sleeve at the deepest position of the stroke.

In accordance with the present invention, an axial groove is formed on the inside surface of the sleeve starting at its outer end and terminating in an internal abutment which is midway along the length of the cage and which registers with a radially extending stop fixed to the end of the post, the cage being biased axially outward with respect to the post so that the stop is bottomed on the abutment with the cage in a semi-extended position for equalized travel of the cage with respect to both the post and the sleeve. More specifically, a plurality of grooves are formed in the cage symmetrically arranged and cooperating with a freely rotatable stop member having a set of registering stop elements so that the cage is free to rotate during use for equalizing and distributing the wear on the bearing surfaces. Thus I provide, along the inner wall 23 of the cage, and starting at the outer end 24, a pair of grooves 31, 32 which are diametrically arranged with respect to one another and which terminate in internal abutments 33, 34 respectively (see also FIG. 4). For engaging the abutments I provide a stop member 40 in the form of a washer or disc having diametrically extending tangs 41, 42 which project radially outward beyond the surface of the post. The grooves are preferably semi-circular in profile as shown in FIG. 3 and the tangs are complementarily shaped. The groove profile is produced at little expense by chucking the sleeve, for example prior to installation of the balls, and by advancing a milling cutter of diameter corresponding to the desired groove diameter into cutting engagement with the soft metal forming the inside of the cage. Either an end-faced cutter may be employed with axial advancement or a side cutter may be used which is inserted and then advanced laterally into cutting engagement. Since the grooves are smoothly rounded and of shallow average depth, the strength of the cage is not substantially affected.

In accordance with one of the features of the invention the stop member 40 is secured to the end of the post by means of a machine screw or the like which is axially centered and which permits the stop member to have a small amount of freedom or play in both the axial and radial directions. Thus turning to FIG. 5, which shows the end of the post in cross section, the stop member 40 has a central opening through which is inserted a machine screw 44 with a bushing 45 interposed between them. The bushing 45 has a flange 46 and an inner end which bottoms on the end of the post. The length of the bushing, under the flange, provides head room which exceeds the thickness of the stop member or washer 40 by a small amount, say on the order of 1/32 inch to provide a small amount of axial play, and the diameter of the washer preferably exceeds the diameter of the bushing by about the same amount to provide lateral play in all directions. This not only enables the stop member to center itself with respect to the two grooves to minimize wear but insures rotational freedom of the stop member so that the stop member, and cage, are free to rotate, or creep, during the normal operation of the device so that the balls will not wear grooves in the bearing surfaces on the post and sleeve respectively.

In carrying out the invention, means are provided for biasing the cage 20 so that it occupies a properly phased, semi-extended position at the time that the post and sleeve come into engagement. In such semi-extended position the stops 41, 42 are bottomed on the abutments 33, 34 with approximately half of the length of the cage extended beyond the end of the port. Turning to FIG. 2, which shows the post and sleeve about to overlap or engage one another, it will be apparent that the balls 21, being contacted on one side only, are unloaded and with loading just beginning to be assumed by the ball 21a at the midpoint. As the post travels downwardly from the position shown in FIG. 2 to that shown in FIG. 4 the other balls are progressively engaged, rolling equally against the opposed bearing surfaces. Thus the movement of the cage with respect to the post and sleeve is equalized and the cage approaches its "bottomed" condition at the same time that the post reaches the end of its downward stroke. As a result of the equalizaion of travel, each ball simply rolls on the engaged bearing surfaces without any necessity for sliding or scuffing action. Thus bearing friction and wear are both minimized and free movement of the post over the entire length of the stroke is assured. This freedom of movement is of particular advantage in the fitting of dies by a die maker who must rely on "feel" when the final die adjustments are made.

In order to insure that the stop elements 41, 42 remain in register at all times with the grooves 31, 32 at the bottom of the stroke, even where a slightly overlong post is used, a retaining ring is preferably fitted in the inside surface of the cage adjacent the outer end 24 thereof. In the present instance the retaining ring is in the form of a snap ring 50 fitting in an annular groove 51. The retaining ring cooperates with the stop member 40, with the periphery of the stop member bottoming about the entire periphery of the retaining ring in the event the desired stroke is exceeded.

Where the post occupies the upper position, as shown in the drawing, gravity bias may be relied upon to insure bottoming of the stops on the abutments. However, I prefer to employ a coil spring 55 surrounding the base of the post and having its outer end bearing directly upon the inner end of the cage. Use of the spring adds to the versatility of the arrangement since, by using a spring of proper rate, sufficient to overcome the force of gravity, the post and sleeve may be inverted and the assembly may be used with equal advantage with the sleeve in the upper position. Indeed, the inverted arrangement may be preferable since it reduces the likelihood of chips or other foreign material falling into the bearing surfaces.

During the course of the retraction stroke, as the post moves upwardly from the position shown in FIG. 4 to that shown in FIG. 2, the balls are progressively unloaded. As the radial loading is removed from the "final" ball 21a, the cage becomes relatively "loose" and thus free to assume its proper initial position bottomed on the stop member. By adjusting the stroke to insure that the post and sleeve move fully out of their overlapping relation at the top of the stroke, the cage is effectively repositioned, or phased, with a high degree of accuracy for each stroke and there is no possibility of progressive axial creep out of the desired phase position. However, during the period of "looseness" the cage and stop member, together, are free to rotate slightly so that the balls are not forced to travel an identical pattern on the bearing surfaces.

It will thus be apparent to one skilled in the art that the above arrangement has a number of worthwhile features and advantages. One of the primary features is that there is no necessity for grooving or otherwise modifying the bearing surfaces as required in some conventional designs of positioning stops. All that is required to support the stop member 40 is a shallow tapped hole at the end of the post, a matter of negligible expense. The grooving of the soft cage metal may similarly be carried out at small expense. The cost of the stop member, machine screw and bushing may be measured in pennies; as a result, ball bearing die sets of the present design with their attendant features and advantages may be manufactured at a cost which is susbtantially less than that of die sets using more conventional arrangements. Assembly is extremely simple involving the screwing in of but a single cap screw.

Inventory requirements are reduced since the same type of posts and sleeves may be used, free of special grooving or boring, as are employed in conventional die sets.

In the following claims the term "engaged" and "disengaged" as applied to the post and sleeve combination has reference to the condition of overlap between them. The term "semi-extended," applied to the free condition of the cage, is intended to denote a condition in which substantially half of the cage projects beyond the end of the post. The term "equalized travel" used in the claims refers to the fact that the cage, during the course of its downward travel, moves the same distance, with respect to the post and sleeve, from its initial position to obviate scuffing at the ball surfaces. The terms "inner" and "outer" are to be read with respect to the post mounting in view of the fact that the assembly may be inverted in use. The term "axial and radial play" is not intended to denote a great amount of lost motion but simply that degree of freedom or clearance which enables the stop to rotate freely with respect to the post. The term "washer" is intended to mean a small plate, or piece, of metal pivoted at its center which is preferably, but not necessarily, of round configuration.

While in the preferred embodiment the stop elements are located at the end of the post and cooperate with abutments located halfway along the length of the sleeve, it will be understood by one skilled in the art that the invention is not limited to this specific structure and would include a less advantageous alternative in which the tangs on the stop member 40 are extended and bent upwardly, within the cooperating grooves, to define stop surfaces which lies somewhat above the level of the end of the post. This would, of course, require the grooves to be correspondingly lengthened to achieve the "semi-extended" condition discussed above. Consequently, the term "midway" should not be construed to mean that the abutments on the sleeve are located exactly halfway on the sleeve and such abutments may be located somewhat off-center by an amount equal to the axial offset between the stop surfaces on the tangs and the end of the post.

I claim as my invention:

1. In a ball bearing die set the combination comprising a post, a cooperating sleeve, a ball bearing cage of cylindrical shape having captive balls spaced axially and peripherally therein and having an inner end and an outer end, the cage having an internal groove axially along the inner surface starting at its outer end and terminating in an internal abutment midway along the length of the cage, a stop fixed to the end of the post and registering with the groove, said cage being biased outwardly with respect to the post so that when the post and the sleeve are disengaged the stop is bottomed on the abutment with the cage in a semi-extended position phased for equalized travel of the cage with respect to the post and sleeve upon subsequent re-engagement.

2. In a ball bearing die set the combination comprising a post, a cooperating sleeve, a ball bearing cage of cylindrical shape having captive balls spaced axially and peripherally therein and having an inner end and an outer end, the cage having an internal groove axially along the inner surface starting at its outer end and terminating in an internal abutment midway along the length of the cage, a stop secured to the outer end of the post and extending radially therefrom into register with the groove, said cage being biased outwardly with respect to the post so that when the post and the sleeve are disengaged the stop is bottomed on the internal abutment with the cage in a semi-extended position phased for equalized travel of the cage with respect to the post and sleeve upon subsequent re-engagement, said stop being freely pivoted along the axis of the post so that the stop and the cage are both free to randomly rotate with the result that the wear of the balls is evenly distributed about the co-operating surfaces of the post and sleeve respectively.

3. In a ball bearing die set the combination comprising a post, a cooperating sleeve, a ball bearing cage of cylindrical shape having captive balls spaced axially and peripherally therein and having an inner end and an outer end, the cage having a plurality of symmetrically arranged grooves extending along the inner surface starting at the outer end and terminating in internal abutments midway along the length of the cage, and a stop member axially pivoted at the outer end of the post and having symmetrically arranged stop elements for registering with the respective grooves, said cage being biased outwardly with respect to the post so that when the post and sleeve are disengaged the stop elements are bottomed on their respective abutments with the cage in a semi-extended position phased for equalized travel of the cage with respect to the post and sleeve upon subsequent re-engagement.

4. In a ball bearing die set the combination comprising a post, a cooperating sleeve, a ball bearing cage of cylindrical shape having captive balls spaced axially and peripherally therein and having an inner end and an outer end, the cage having a pair of diametrically arranged axial grooves extending along its inner surface starting at its outer end and terminating in a pair of internal abutments midway along the length of the cage, a washer secured to the outer end of the post for registering with the respective grooves, said washer having a limited amount of axial and radial play so that the washer is free to assume a centered position with respect to the grooves and so that the washer and cage are free to assume a random position with respect to the post and sleeve thereby to distribute the wear of the balls over the entire presented surfaces of the post and sleeve respectively.

5. The combination set forth in claim 4 in which the grooves are of generally semi-circular contour and in which the tangs are complementarily shaped with clearance between the edge of each tang and the surface of the cooperating groove.

6. In a ball bearing die set the combination comprising a post, a cooperating sleeve, a ball bearing cage of cylindrical shape having captive balls spaced axially and peripherally therein and having an inner end and an outer end, the cage having an internal groove formed axially along its inner surface starting at its outer end and terminating in an internal abutment midway along the length of the cage, a stop member axially secured at the bottom of the post and extending radially therefrom beyond the radius of the post and into registering engagement with the groove, said cage being biased outwardly with respect to the post so that when the post and sleeve are disengaged the stop is bottomed on the abutment with the cage in a semi-extended position phased for equalized travel of the cage with respect to the post and sleeve upon subsequent re-engagement, said bias being provided by a coil spring surrounding the base portion of the post and pressing outwardly upon the inner end of the cage to insure bottoming of the stop regardless of whether the post lies above or below the sleeve.

7. In a ball bearing die set the combination comprising a post, a cooperating sleeve, a ball bearing cage of cylindrical shape having captive balls spaced axially and peripherally therein and having an inner end and an outer end, the cage having an internal groove formed axially along its inner surface starting at its outer end and terminating in an internal abutment midway along the length of the cage, a stop secured to the end of the post and extending radially beyond the post radius for registering with the groove, said cage being biased outwardly with respect to the post so that when the post and the sleeve are disengaged the stop is bottomed on the abutment, and a retaining ring engaging an internal annular groove formed in the inner wall of the retainer adjacent its outer end for bottoming on the stop to limit the telescoping movement of the cage relative to the post as the post and sleeve are engaged with one another.

References Cited
UNITED STATES PATENTS

| | | | |
|---|---|---|---|
| 2,422,775 | 6/1947 | Conner | 308—6 |
| 2,774,430 | 12/1956 | Blazek | 308—4 |
| 2,846,278 | 8/1958 | Blazek | 308—6 |
| 2,987,348 | 6/1961 | Blazek | 308—6 |
| 2,997,969 | 8/1961 | Holmes | 83—637 X |

MARTIN P. SCHWADRON, *Primary Examiner.*

L. L. JOHNSON, *Assistant Examiner.*